United States Patent [19]

Eckhardt

[11] Patent Number: 4,958,442

[45] Date of Patent: Sep. 25, 1990

[54] MEASURING DEVICE, SPECIFICALLY FOR MEASURING THE DIAMETER OF ROLLS ON ROLL GRINDERS

[75] Inventor: Roland Eckhardt, Giengen, Fed. Rep. of Germany

[73] Assignee: J. M. Voith GmbH, Heidenheim, Fed. Rep. of Germany

[21] Appl. No.: 396,440

[22] Filed: Aug. 21, 1989

[30] Foreign Application Priority Data

Aug. 19, 1988 [DE] Fed. Rep. of Germany ....... 3828181

[51] Int. Cl.$^5$ .......................... G01B 5/08; G01B 3/38
[52] U.S. Cl. ...................................... 33/783; 33/550; 33/551; 33/555.1
[58] Field of Search ............... 33/550, 551, 552, 555.1, 33/572, 657, 783, 25.1, 25.2

[56] References Cited

U.S. PATENT DOCUMENTS

| | | | |
|---|---|---|---|
| 3,104,472 | 11/1960 | Eppler | 33/555.1 |
| 3,226,833 | 1/1966 | Lemelson | 33/783 |
| 4,240,205 | 12/1980 | Tuss | 33/1 M |
| 4,614,038 | 9/1986 | Fivaz et al. | 33/555.1 |

*Primary Examiner*—William A. Cuchlinski, Jr.
*Assistant Examiner*—Alvin Wirthlin
*Attorney, Agent, or Firm*—Albert L. Jeffers

[57] ABSTRACT

For a measuring device, a boom, rotatable arm, guide arm and cross beam form a parallel crank drive which is mounted so as to be swivelable about the vertical axis of a supporting column. A clamping device for the rotatable arm makes it possible to use only a single drive for both a coarse swivel motion and a precision swivel motion for precision adjustment in order to home in on the measuring position. Measuring probes are attached to measuring support bars that are mounted on the cross beam, and are movable in vertical direction.

4 Claims, 3 Drawing Sheets

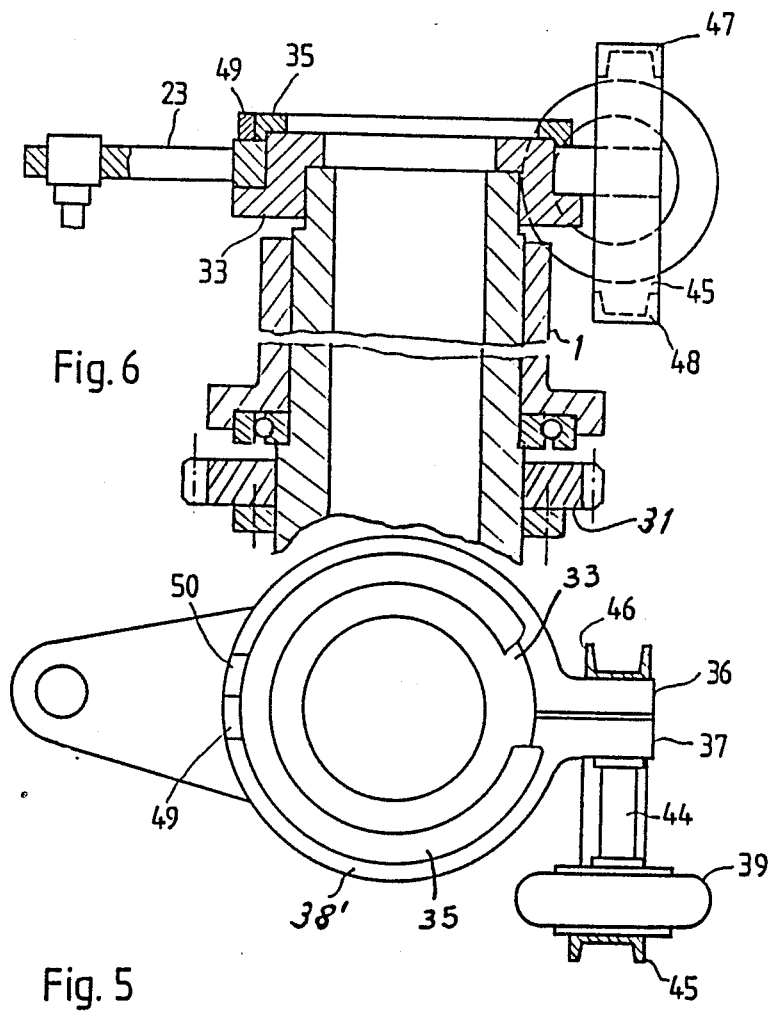

MEASURING DEVICE, SPECIFICALLY FOR MEASURING THE DIAMETER OF ROLLS ON ROLL GRINDERS

BACKGROUND OF THE INVENTION

The invention concerns a measuring device for roll grinders where a vertical column supports an arm that can be swiveled about its longitudinal axis. Such a measuring device is known from the German Patent Document No. 836 574, whereby a column is provided on which a measuring arm is arranged so as to be both swivelable and adjustable in height. For rough determination of the height setting, the column is provided with a dial type graduation or is coordinated with such. A prerequisite here is that the longitudinal axis of the rolls will always be at the same level because only a single measuring arm is available.

There are also measuring devices of the type, for instance according to the German patent publication No. 12 95 199, where the measuring arm is vertically movable on a vertical column. However, such a measuring device does not serve the measuring of roll diameters but of bores in other workpieces.

Additionally, a measuring device is known also from the German Patent Document No. 15 02 411, which includes two measuring arms which are movably supported on a slide carriage of a cross beam. Here, too, a prerequisite is that the position of the longitudinal axes of the rolls is always the same.

The problem underlying the invention is to provide a stable measuring device for arbitrary positions of the longitudinal axes of rolls, which device additionally requires relatively few drive elements.

This problem is solved in a novel way through the features of the present invention. A particularly favorable embodiment is set forth herein.

SUMMARY OF THE INVENTION

A measuring device for a roll grinder involves a vertical column having a longitudinal axis, a boom supported by the column and mounted thereto so as to be swivelable about the longitudinal axis of the column, a rotatable arm mounted to the column for rotation about the axis of the column, and a guide arm mounted to the rotatable arm and articulated therewith, with the guide arm extending parallel to the boom. A cross beam is mounted to the column and to the guide arm such that the boom, rotatable arm, guide arm and an interposing section of the cross beam form a parallel crank drive. The cross beam further is mounted so as to be swivelable parallel to the rotatable arm in a horizontal plane extending perpendicularly to the column. The cross beam supports a first vertical measuring support bar near the column disposed parallel to the axis of the column, and also supports a second vertical measuring support bar away from the column disposed parallel to the axis of the column. The first and second vertical measuring support bars are supported for vertical displacement parallel to the axis of the column through a respective rotary coupling each. The cross beam further supports the vertical measuring support bars for horizontal displacement perpendicular to the axis of the column. A clamping device is disposed at the mounting of the rotatable arm to the column for clamping the parallel arm to the column against rotation.

It is an object of the present invention to provide a stable measuring device for arbitrary positions of the longitudinal axes of rolls, which device additionally requires relatively few drive elements.

Further objects and advantages of the present invention will be apparent from the following descriptions of a preferred embodiment.

BRIEF DESCRIPTION OF THE DRAWINGS

The invention will be explained hereafter with the aid of an embodiment illustrated in the figures of the drawing.

FIG. 5 shows a clamping device in plan view; and

FIG. 6 shows a corresponding cross section of the clamping device of FIG. 5.

DESCRIPTION OF THE PREFERRED EMBODIMENT

Figure 1:
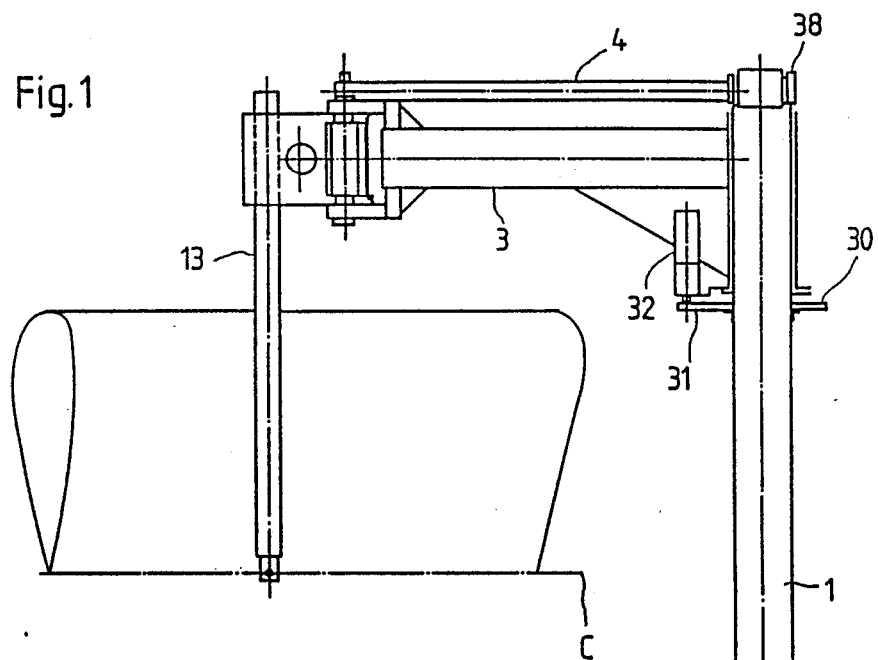
FIG. 1 shows an elevational view in transverse direction.
Figure 2:
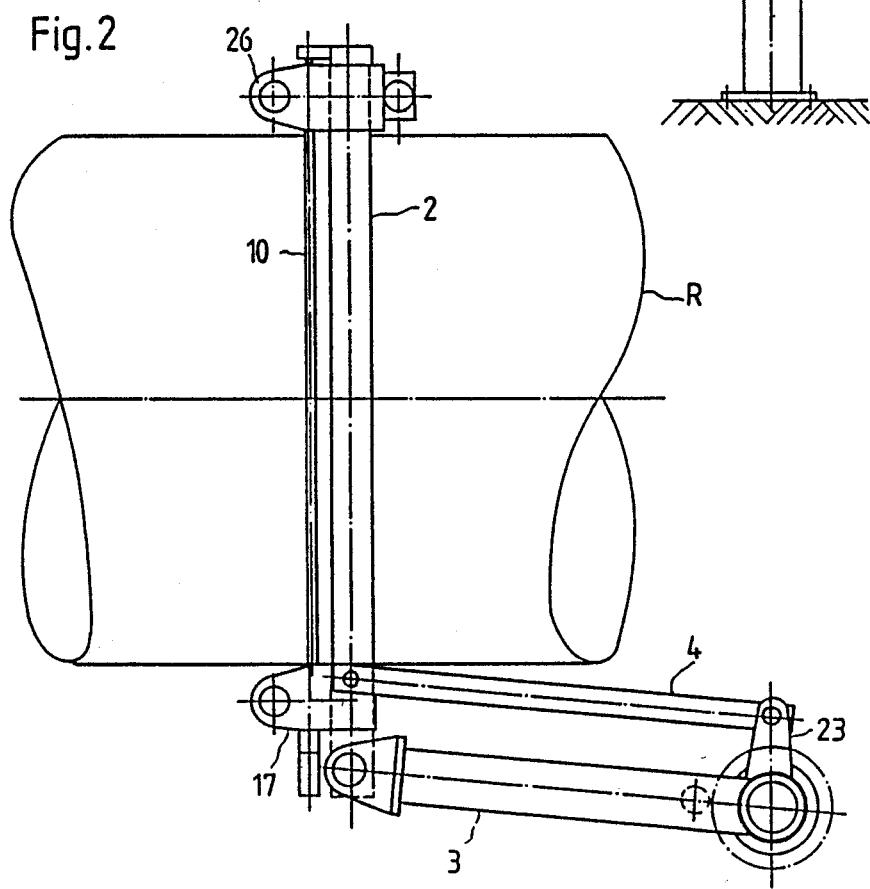
FIG. 2 shows a plan view.

As can be seen from FIGS. 1 and 2, the measuring device includes boom 3 mounted on vertical column 1 and rotatable arm 23. In addition, guide arm 4 is mounted on rotatable arm 23, and cross beam 2 is mounted to boom 3 and guide arm 4. Measuring support bars 13 and 14 (FIG. 3) extend parallel to column 1. The said arms 4 and 23 and the cross beam 2 form a parallel crank drive. Boom 3 with its drive, specifically electric drive motor 32, is preferably coupled to vertical column 1 via gear 30 and pinion 31. The roll to be processed on the roll grinder and to be measured, with its center axis C, is marked R and illustrated here only in part.

Figure 3:
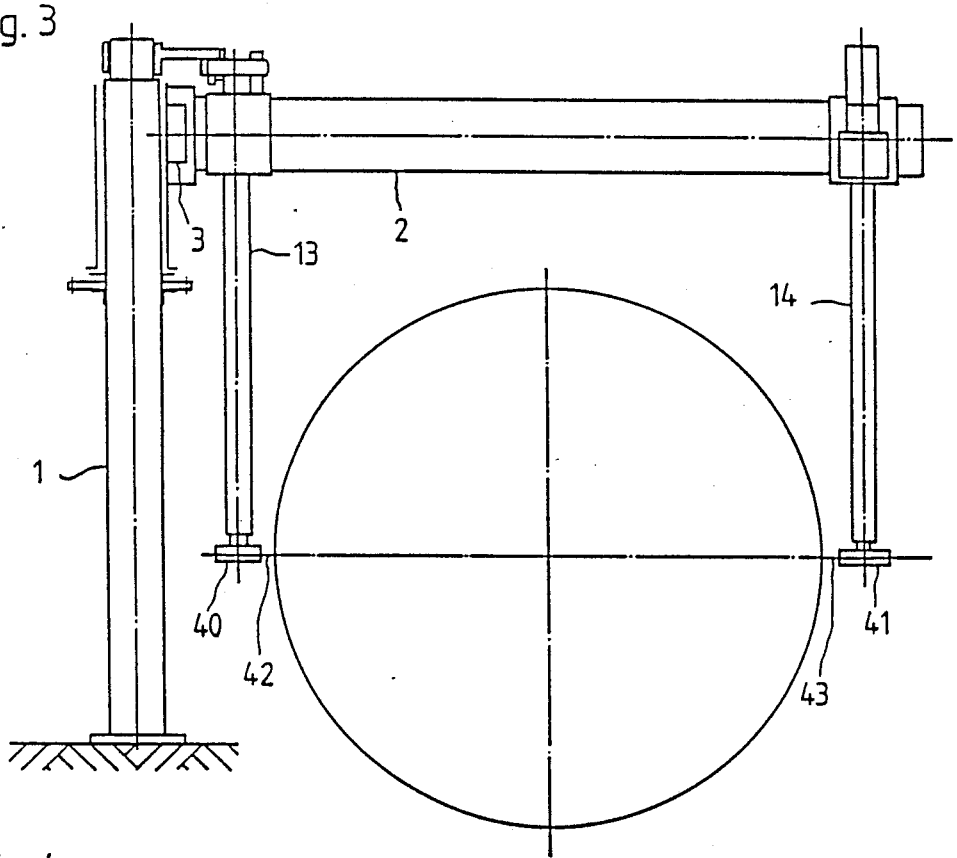
FIG. 3 shows an elevational view in longitudinal direction.

Referring to FIG. 3, there is mounted on the bottom ends of the measuring support bars 13 and 14 the measuring devices 40 and 41 with measuring probes 42 and 43.

The measuring support bars 13 and 14 are fashioned, at least on their top ends, as threaded spindles so that, as will yet be described, they can be adjusted vertically. When they are retracted upward all the way, the cross beam 2 can readily be swung away from the roll by means of the drive motor 32. The column 2 can additionally be displaced along the roll axis C, consistent with the measuring device according to the said German Patent Document No. 836 574, so that for each section of the roll its diameter can be determined.

The rotatable arm 23 is mounted on column 1 by means of a ring 38 and can be clamped in position on column 1 by means of a clamping device, specifically in the measuring position or in the starting position of the boom 3 that is required to that end, respectively. This can be effected, e.g., in the fashion of a band brake, with the clamping band being preferably tightened by means of a bellows.

For the measuring process, boom 3 is swiveled to a point such that the center axis of rotatable arm 23 (i.e., the connecting axis between the vertical axis of the column and the swivel axis of guide arm 4 in the, rotatable arm) is perpendicular the roll axis C. Next, rotatable arm 23 is clamped in place, by means of said clamping device, and boom 3 further approaches the roll until measuring device 40 of measuring support bar 13 on the near side of the column is in measuring position. The swiveling of boom 3 is effected by means of its.. motor drive 32. In the process it is assured that both the rotatable arm 23 and the cross beam 2 remain aligned exactly perpendicular to the roll axis C. Thus, the boom 3, rotatable arm 23, guide arm 4 and cross beam 2 act the same as a parallel crank drive. The drive motor 32 is preferably an electronically controlled stepper.

Figure 4:
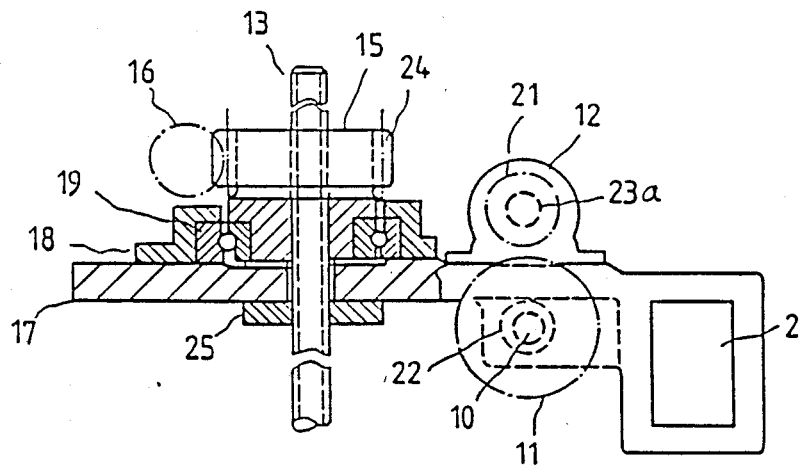
FIG. 4 shows an enlarged elevational view in the longitudinal direction, viewed from the other side (measuring support side) of the measuring support drive devices, partly in cross section.

Referring specifically to FIG. 4 the measuring support bar 14 is now adjusted horizontally by means of the rotary drive consisting of the spindle 10 with threading 22, drive gear 11 and pinion 21 in mesh with it, which is driven by the shaft 23a of an electric motor 12. In addition to this drive, plate 17, which is fixed on cross beam 2, supports also the drive for the measuring support bar 13 near the column. The corresponding drive for the measuring support bar 14 away from the column is practically of same design. A plate 26 corresponding to support plate 17 is movably provided also on the other end of cross beam 2. The measuring support bar 13 is at least in its upper part fashioned as a threaded spindle, so that by rotation of spindle nut 15 with the spindle fixed rotationally, for instance by tongue and groove, it can be moved in vertical direction (parallel to the column 1). The drive of spindle nut 15 is provided through outer ring gear 24, the teeth of which correspond to that of a worm gear, with which the worm gear 16 meshes. This worm gear 16 is mounted on the shaft of an electric drive motor not illustrated here. The spindle nut 15 is mounted preferably through the intermediary of an angular ball bearing 19 which is fastened on support plate 17 by means of a holder ring 18. Additionally, a support plate 25 for spindle 13 is provided below support plate 17.

To achieve minimum play it is recommended to use a trapezoidal threading for the spindle.

Selecting a stepper motor as drive motor 32 for boom 3 has the advantage that the swivel operation in the swing-in of the measuring device can be automated, so that the swing-in and swing-out can be performed by depression of a button. The same is possible when providing stepper motors as well for the other drives illustrated in FIG. 4 or mentioned in its description. Since generally a numeric control based on electronic data processing is used today for the control of the roll grinder, all of the processes can be automated readily, The clamping device for fixing rotatable arm 23 is illustrated in FIGS. 5 and 6. Rotatable arm 23 is mounted on a support ring 38' featuring two flanges 36 and 37, at the point of which it is slotted. By means of a compression arm 44 and a frame 45, 46, 47 and 48 consisting of U-iron, the compressive force of a hydraulic bellows 39 is utilized for tensioning the flanges 36 and 37 of the support ring 38' against each other, thus fixing support ring 38' on the bearing ring 33 that is mounted on column 1. Stops 49 and 50, of which the former is fastened to a terminating ring 35 which is fixedly connected with bearing ring 33 while the latter is fastened to clamping ring 38', enable a very accurate positioning of rotatable arm 23 and thus also boom 3. The latter is then aligned exactly perpendicular to the longitudinal axis C of the roll. Other clamping devices are possible as well,

What is claimed is:

1. A measuring device for a roll grinder comprising:
   a vertical column having a longitudinal axis;
   a boom supported by said column and mounted thereto so as to be swivelable about the longitudinal axis of said column;
   a rotatable arm mounted to said column for rotation about the axis of said column;
   a guide arm mounted to said rotatable arm and articulated therewith, said guide arm extending parallel to said boom;
   a cross beam mounted to said column via said guide arm and said boom that said boom, rotatable arm, guide arm and an interposing section of the cross beam form a parallel crank drive, said cross beam further being mounted so as to be swivelable parallel to said rotatable arm in a horizontal plane extending perpendicularly to said column, said cross beam supporting a first vertical measuring support bar near said column disposed parallel to the axis of said column, and supporting a second vertical measuring support bar away from said column disposed parallel to the axis of said column, said first and second vertical measuring support bars being supported for vertical displacement parallel to the axis of said column through a respective rotary coupling each, said cross beam further supporting said vertical measuring support bars for horizontal displacement perpendicular to the axis of said column; and
   a clamping device disposed at the mounting of said rotatable arm to said column for clamping said rotatable arm to said column against rotation.

2. A measuring device according to claim 1, in which a drive is coupled with the boom for swiveling the boom about the axis of the column.

3. A measuring device according to claim 1, and including a threaded spindle parallel to the cross beam, a bracket supporting the first measuring support bar near the column and driven by said threaded spindle through a displacement, and a rotary mounting connected with a holder plate on the cross beam for mounting the first measuring support bar near the column.

4. A measuring device according to claim 2, and including a threaded spindle parallel to the cross beam, a bracket supporting the first measuring support bar near the column and driven by said threaded spindle through a displacement, and a rotary mounting connected with a holder plate on the cross beam for mounting the first measuring support bar near the column.

* * * * *